United States Patent [19]

LoCascio et al.

[11] Patent Number: 5,754,012
[45] Date of Patent: May 19, 1998

[54] PRIMARY SIDE LAMP CURRENT SENSING FOR MINATURE COLD CATHODE FLUORESCENT LAMP SYSTEM

[75] Inventors: James J. LoCascio, San Jose; Urs Harold Mader, Santa Clara, both of Calif.

[73] Assignee: Micro Linear Corporation, San Jose, Calif.

[21] Appl. No.: 726,970

[22] Filed: Oct. 7, 1996

Related U.S. Application Data

[63] Continuation of Ser. No. 377,644, Jan. 25, 1995, abandoned.

[51] Int. Cl.$^6$ .................................................. H05B 37/02
[52] U.S. Cl. ......................... 315/307; 315/DIG. 4; 315/224; 315/276; 331/114
[58] Field of Search ............................. 315/219, 224, 315/307, DIG. 7, DIG. 4, 246, 169.3, 276; 331/114, 113 A

[56] References Cited

U.S. PATENT DOCUMENTS

| | | | |
|---|---|---|---|
| 2,483,815 | 10/1949 | Easton | 175/356 |
| 2,967,267 | 1/1961 | Steinman et al. | |
| 3,292,579 | 12/1966 | Buchanan | 119/5 |
| 3,549,990 | 12/1970 | Hochheiser | 323/44 |
| 3,611,021 | 10/1971 | Wallace | 315/239 |
| 3,758,823 | 9/1973 | Jett et al. | 315/219 |
| 3,772,625 | 11/1973 | Raupach | 336/94 |
| 3,778,677 | 12/1973 | Kriege | 315/219 |
| 3,828,203 | 8/1974 | Belson et al. | 330/69 |
| 3,840,795 | 10/1974 | Roszyk et al. | 320/2 |
| 3,893,036 | 7/1975 | Cavoretto et al. | 327/126 |
| 3,921,005 | 11/1975 | Watrous | 307/64 |
| 3,953,768 | 4/1976 | Meredith et al. | 317/31 |
| 4,030,058 | 6/1977 | Riffe et al. | 336/92 |
| 4,031,449 | 6/1977 | Trombly | 320/2 |
| 4,038,625 | 7/1977 | Tompkins et al. | 336/83 |
| 4,063,108 | 12/1977 | Klett et al. | 307/64 |

(List continued on next page.)

FOREIGN PATENT DOCUMENTS

| | | | |
|---|---|---|---|
| 0 059 064 | 9/1982 | European Pat. Off. | H05B 41/392 |
| 0 178 852 | 4/1986 | European Pat. Off. | H05B 41/26 |
| 32 33 655 A1 | 5/1983 | Germany | H05B 41/29 |
| 34 32 266 A1 | 3/1985 | Germany | H05B 41/26 |
| 9201334 | 1/1992 | WIPO | H03K 3/281 |

OTHER PUBLICATIONS

Micro Linear, "Advance Information ML-4830 Electronic Ballast Controller", Jun. 1992.
J. Williams, "Techniques for 92% Efficient LCD Illumination" *Linear Technology Application Note* 55, pp. AN55-1-43, Aug. 1993.
Micro Linear, "ML4874 LCD Backlight Lamp Driver," pp. 1-6, Apr. 1994.
Micro Linear, "ML 4876 LCD Backlight Lamp Driver with Contrast," pp. 1-6, Apr. 1994.
U. Mader, et al., Micro Linear, "Application Note 26 -Power Conversion Efficiencies for Miniature Fluorescent Lamp," pp. 1-6, Feb. 1994.

(List continued on next page.)

*Primary Examiner*—Robert Pascal
*Assistant Examiner*—Arnold Kinkead
*Attorney, Agent, or Firm*—Haverstock & Associates

[57] ABSTRACT

A circuit for sensing a current in a fluorescent lamp. A control system comprises a buck regulator circuit for supplying a buck current, an inverter circuit for receiving the buck current and for generating a lamp voltage, a circuit for sensing a current in a fluorescent lamp, and a controller for controlling the buck regulator and the inverter. The inverter comprises a Royer-type inverter, a resonant tank, and a transformer. A current flows through a primary winding of the transformer to generate a voltage in a secondary winding of the transformer. The fluorescent lamp is coupled to the secondary winding of the transformer so that the fluorescent lamp is isolated from the remainder of the control system by the transformer. The circuit for sensing the current in the lamp senses a current in the Royer-type inverter which is representative of the current in the lamp. The circuit for sensing the current in the lamp is coupled to the controller for controlling the buck regulator and the inverter.

33 Claims, 2 Drawing Sheets

U.S. PATENT DOCUMENTS

| | | | |
|---|---|---|---|
| 4,144,462 | 3/1979 | Sieron et al. | 307/66 |
| 4,146,857 | 3/1979 | Schleupen | 336/61 |
| 4,172,981 | 10/1979 | Smith | 307/66 |
| 4,207,498 | 6/1980 | Spira et al. | 315/97 |
| 4,210,846 | 7/1980 | Capewell et al. | 315/121 |
| 4,225,825 | 9/1980 | Watts | 327/134 |
| 4,251,752 | 2/1981 | Stolz | 315/206 |
| 4,260,943 | 4/1981 | Zaderej et al. | 320/21 |
| 4,277,726 | 7/1981 | Burke | 315/98 |
| 4,277,728 | 7/1981 | Stevens | 315/307 |
| 4,297,614 | 10/1981 | Chandler | 315/86 |
| 4,303,902 | 12/1981 | Lesster et al. | 336/83 |
| 4,318,608 | 3/1982 | Payne | 355/3 CH |
| 4,390,844 | 6/1983 | Ting | 327/345 |
| 4,414,493 | 11/1983 | Henrich | 315/308 |
| 4,441,053 | 4/1984 | Daspit | 315/206 |
| 4,441,054 | 4/1984 | Bay | 315/219 |
| 4,453,109 | 6/1984 | Stupp et al. | 315/219 |
| 4,486,689 | 12/1984 | Davis et al. | 315/92 |
| 4,495,446 | 1/1985 | Brown et al. | 315/206 |
| 4,496,896 | 1/1985 | Melocik et al. | 320/2 |
| 4,498,031 | 2/1985 | Stupp et al. | 315/307 |
| 4,523,131 | 6/1985 | Zansky | 315/307 |
| 4,528,482 | 7/1985 | Merlo | 315/291 |
| 4,543,556 | 9/1985 | Taylor et al. | 336/210 |
| 4,572,988 | 2/1986 | Handler et al. | 315/209 R |
| 4,585,974 | 4/1986 | Stupp et al. | 315/307 |
| 4,604,552 | 8/1986 | Alley et al. | 315/176 |
| 4,612,479 | 9/1986 | Zansky | 315/194 |
| 4,654,573 | 3/1987 | Rough et al. | 320/2 |
| 4,686,427 | 8/1987 | Burke | 315/219 |
| 4,698,554 | 10/1987 | Stupp et al. | 315/307 |
| 4,700,113 | 10/1987 | Stupp et al. | 315/224 |
| 4,704,563 | 11/1987 | Hussey | 315/307 |
| 4,717,863 | 1/1988 | Zeiler | 315/307 |
| 4,723,098 | 2/1988 | Grubbs | 315/306 |
| 4,739,277 | 4/1988 | Anderson | 315/260 |
| 4,763,239 | 8/1988 | Ball | 363/98 |
| 4,800,328 | 1/1989 | Bolger et al. | 320/2 |
| 4,874,989 | 10/1989 | Nilssen | 315/151 |
| 4,893,059 | 1/1990 | Nilssen | 315/127 |
| 4,896,077 | 1/1990 | Dodd et al. | 315/289 |
| 4,920,299 | 4/1990 | Presz et al. | 315/98 |
| 4,935,669 | 6/1990 | Nilssen | 315/105 |
| 4,942,352 | 7/1990 | Sano | 320/2 |
| 4,952,849 | 8/1990 | Fellows et al. | 315/307 |
| 5,015,919 | 5/1991 | Vila-Masot et al. | 315/86 |
| 5,048,033 | 9/1991 | Donahue et al. | 372/38 |
| 5,049,790 | 9/1991 | Herfurth et al. | 315/291 |
| 5,111,118 | 5/1992 | Fellows et al. | 315/307 |
| 5,177,408 | 1/1993 | Marques | 315/291 |
| 5,202,608 | 4/1993 | Johnson | 315/86 |
| 5,214,352 | 5/1993 | Love | 315/86 |
| 5,216,402 | 6/1993 | Carosa | 336/66 |
| 5,237,242 | 8/1993 | Takahashi et al. | 315/123 |
| 5,264,776 | 11/1993 | Hulsey | 320/2 |
| 5,363,020 | 11/1994 | Chen et al. | 315/209 R |
| 5,367,223 | 11/1994 | Eccher | 315/97 |
| 5,367,224 | 11/1994 | Pacholok | 315/219 |
| 5,367,242 | 11/1994 | Hulman | 320/2 |
| 5,384,516 | 1/1995 | Kawabata et al. | 315/160 |
| 5,394,020 | 2/1995 | Nienaber | 327/140 |
| 5,408,162 | 4/1995 | Williams | 315/224 |
| 5,615,093 | 3/1997 | Nalbant | 363/25 |
| 5,642,066 | 6/1997 | Burke | 327/132 |

OTHER PUBLICATIONS

K. Kit Sum, et al., Micro Linear, "Application Note 32 – Theory and Application of the ML4874 and ML4876 LCD Backlight Controller ICs," pp. 1–12, Jun. 1994.

J.J. LoCascio and U. H. Mader, "New Control Technique Uses 25% Less Power To Drive Miniature Cold Cathode Fluorescent Lamps," *Electronic Ballast*, pp. 60–69, Apr. 1994.

M. Jordan and J.A. O'Connor, "Resonant Fluorescent Lamp Converter Provides Efficient and Compact Solution," *IEEE*, pp. 424–431, 1993.

Maxim Integrated Products, "CCFT Backlight and LCD Contrast Controllers –MAX753/MAX754," pp. 1–12, Feb. 1994.

K. Kit Sum, Micro Linear, "ML4874 Evaluation Kit User's Guide –LCD Backlight Lamp Driver," pp. 1–5, Apr. 1994.

Micro Linear, "ML4864 Evaluation User's Guide –LCD Backlight Lamp Driver with Contrast Control," pp. 1–4, Jan. 1994.

Micro Linear, "ML4864 LCD Backlight Lamp Driver with Contrast Control," pp. 1–6, Nov. 1993.

Micro Linear, "Application Note 24", p. 3.

5,754,012

PRIMARY SIDE LAMP CURRENT SENSING FOR MINATURE COLD CATHODE FLUORESCENT LAMP SYSTEM

This is a continuation of application Ser. No. 08/377,644, filed on Jan. 25, 1995, now abandoned.

FIELD OF THE INVENTION

This invention relates to circuits for supplying power to fluorescent lamps. More specifically, this invention relates to control systems for supplying power to miniature cold cathode fluorescent lamps that sense lamp current on the primary side of the lamp transformer.

BACKGROUND OF THE INVENTION

Fluorescent lamps have "negative resistance." This means that the operating voltage decreases as power dissipation in the lamp increases. Therefore, circuits for supplying power to fluorescent lamps require a controllable alternating current power supply and a feedback loop that accurately monitors a current in the lamp in order to maintain operating stability of the circuit and to have an ability to controllably vary the lamp brightness. Such circuits for supplying power to fluorescent lamps may comprise a transformer wherein the lamp is coupled to the transformer and is isolated from the rest of the circuit by the transformer. This makes directly sensing the lamp current difficult. What is needed is a circuit for accurately sensing the current in a fluorescent lamp that is isolated by a transformer.

One such circuit is disclosed on pages 17 and 18 of Application Note 55, "Techniques for 92% Efficient LCD Illumination," published by Linear Technology Corporation. These circuits have a current shunt connected to the voltage source through which travels the current that supplies the inverter transformer. The current sensing shunt is before (on the battery side) the inverter and the buck stage is after the inverter. The same current that travels through the current shunt drives the bases of two bipolar transistors that comprise the inverter. This routes current away from the transformer that drives the lamp, likely reducing accuracy of the current sensing.

SUMMARY OF THE INVENTION

The invention is a circuit for sensing a current in a fluorescent lamp. A control system comprises a buck regulator circuit for supplying a buck current, an inverter circuit for receiving the buck current and for generating a lamp voltage, a circuit for sensing a current in a fluorescent lamp, and a controller for controlling the buck regulator and the inverter. The inverter comprises a Royer-type inverter, a resonant tank, and a transformer. A current flows through a primary winding of the transformer to generate a voltage in a secondary winding of the transformer. The fluorescent lamp is coupled to the secondary winding of the transformer so that the fluorescent lamp is isolated from the remainder of the control system by the transformer. The circuit for sensing the current in the lamp senses a current in the Royer-type inverter which is representative of the current in the lamp. The circuit for sensing the current in the lamp is coupled to the controller for controlling a duty cycle of the buck regulator.

DETAILED DESCRIPTION OF THE PREFERRED EMBODIMENT

Figure 1:
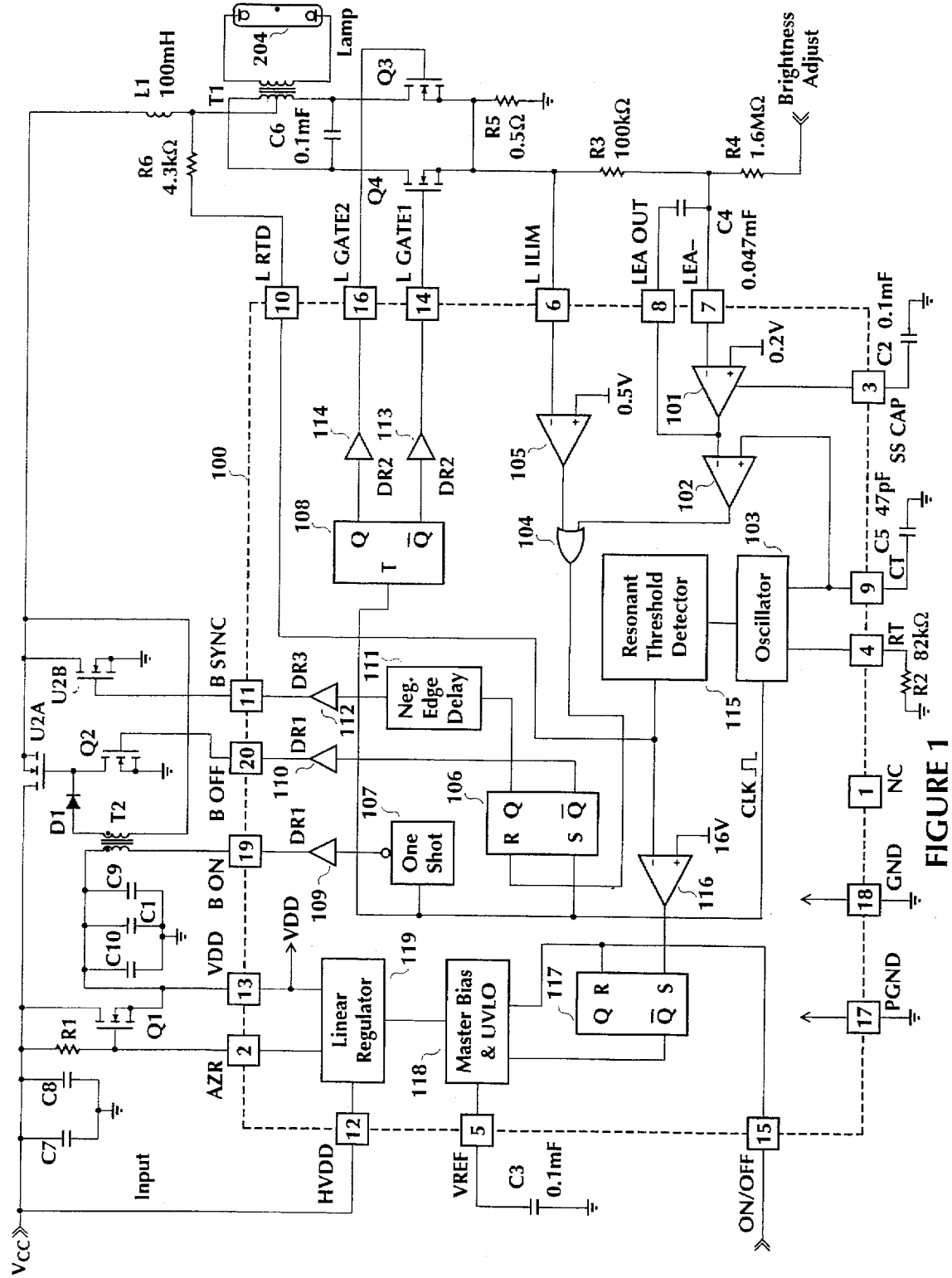
FIG. 1 shows a schematic diagram of the preferred embodiment of the present invention.

Referring to FIG. 1, a liquid crystal display (LCD) backlight integrated circuit controller 100 is shown along with external circuits. The integrated circuit controller 100 includes the portion of the diagram enclosed by the dotted lines. The controller 100, shown in FIG. 1 and bounded by the dotted lines, is an LCD Backlight Lamp Driver, part number ML4874, manufactured by Micro Linear Corporation, which is located at 2092 Concourse Drive, in San Jose, Calif. Micro Linear Corporation also manufactures an LCD Backlight Lamp Driver with Contrast, part number ML4876 and an LCD Backlight Lamp Driver w/Contrast Control, part number ML4864, which are similar to part number ML4874, except they have circuits to control an LCD contrast level. The controller 100 has pins 1–20 that interface with the external circuits.

Referring to portions of the diagram outside the dotted lines, a voltage source node Vcc is coupled to pin 12, to a first terminal of a capacitor C7, to a first terminal of a capacitor C8, to a first terminal of a resistor R1, to a drain of an n-channel MOSFET Q1, and to the drain of an n-channel MOSFET U2-A. A second terminal of the capacitor C7 is coupled to ground. A second terminal of the capacitor C8 is coupled to ground. A second terminal of the resistor R1 is coupled to a gate of the MOSFET Q1 and to pin 2. A source of the MOSFET Q1 is coupled to pin 13, to a first terminal of a capacitor C10, to a first terminal of a capacitor C1, to a first terminal of a capacitor C9 and to a first terminal of a primary winding of a transformer T2. A second terminal of the capacitor C10, a second terminal of the capacitor C1, and a second terminal of the capacitor C9 are coupled to ground. A second terminal of the primary winding of the transformer T2 is coupled to pin 19. A first terminal of a secondary winding of the transformer T2 is coupled to an anode of a diode D1. A second terminal of the secondary winding of the transformer T2 is coupled to a source of the MOSFET U2-A. A cathode of the diode D1 is coupled to a gate of the MOSFET U2-A and to a drain of an n-channel MOSFET Q2. A source of the MOSFET Q2 is coupled to ground. A gate of the MOSFET Q2 is coupled to pin 20. A drain of an n-channel MOSFET U2-B is coupled to the source of the MOSFET U2-A. A source of the MOSFET U2-B is coupled to ground. A gate of the MOSFET U2-B is coupled to pin 11. A first terminal of an inductor L1 is coupled to the source of the MOSFET U2-A. A second terminal of the inductor L1 is coupled to a first terminal of a resistor R6 and to a center tap of a primary winding of a transformer Ti. A second terminal of the resistor R6 is coupled to pin 10. A first terminal of a secondary winding of the transformer T1 is coupled to a first terminal of a fluorescent lamp 204. A second terminal of the secondary winding of the transformer T1 is coupled to a second terminal of the fluorescent lamp 204. A capacitor C11 may be coupled in series with the fluorescent lamp 204, but is not always required. A first terminal of the primary winding of the transformer T1 is coupled to a first terminal of a capacitor C6 and to a drain of an n-channel MOSFET Q3. A gate of the MOSFET Q3 is coupled to pin 16. A source of the MOSFET Q3 is coupled to a first terminal of a resistor R5. A second terminal of the first winding of the transformer T1 is coupled to a second terminal of the capacitor C6 and to a drain of an n-channel MOSFET Q4. A gate of the MOSFET Q4 is coupled to pin 14. A source of the MOSFET Q4 is coupled to the first terminal of the resistor R5. The first terminal of the resistor R5 is coupled to pin 6 and to a first terminal of a resistor R3. A second terminal of the resistor R3 is coupled to a first terminal of a resistor R4, to a first terminal of a capacitor C4 and to pin 7. A second terminal of the resistor R4 is coupled to a voltage level BRIGHT-NESS ADJUST. A second terminal of the capacitor C4 is coupled to pin 8. A first terminal of a capacitor C2 is coupled to pin 3. A second terminal of the capacitor C2 is coupled to ground. A first terminal of a capacitor C5 is coupled to pin 9. A second terminal of the capacitor C5 is coupled to ground. A first terminal of a resistor R2 is coupled to pin 4. A second terminal of the resistor R2 is coupled to ground. Pin 1 is a spare. Pin 18 and Pin 17 are coupled to ground. Pin 15 is coupled to a voltage level ON/OFF. A first terminal of a capacitor C3 is coupled to Pin 15. A second terminal of the capacitor C3 is coupled to ground.

Referring to portions of the diagram comprising the controller 100, which are inside the dotted lines, pin 7 is coupled to an inverting input of a amplifier 101. A non-inverting input of the amplifier 101 is coupled to a reference voltage level of 0.2 volts. A terminal of the amplifier 101 is coupled to pin 3 to couple the optional soft start capacitor C2 to the amplifier 101. An output of the amplifier 101 is coupled to pin 8 and to an inverting input of an amplifier 102. Pin 9 is coupled to a first terminal of an oscillator 103 to set the oscillation frequency with the timing capacitor C5. Pin 9 is also coupled to a non-inverting input to the amplifier 102. An output of the amplifier 102 is coupled to a first input to an OR gate 104. An inverting input to an amplifier 105 is coupled to pin 6. A non-inverting input to the amplifier 105 is coupled to a voltage reference level of 0.5 volts. An output of the amplifier 105 is coupled to a second input to the OR gate 104. An output of the OR gate 104 is coupled to a RESET terminal of a flip-flop 106. A second terminal of the oscillator 103 is coupled to pin 4 to set the oscillation frequency with the timing resistor R2. A third terminal of the oscillator 103 is coupled to deliver a clock signal to a SET terminal of the flip-flop 106, to a first terminal of a one-shot circuit 107 and to a TOGGLE input to a flip-flop 108. A second terminal of the one-shot circuit 107 is coupled to an input terminal to a buffer 109. An output terminal of the buffer 109 is coupled to pin 19. A Q-not output of the flip-flop 106 is coupled to an input to a buffer 110. An output of the buffer 110 is coupled to pin 20. A Q output of the flip-flop 106 is coupled to an input of a negative edge delay 111. An output of the negative edge delay 111 is coupled to an input to a buffer 112. An output of the buffer 112 is coupled to pin 11. A Q-not output of the flip-flop 108 is coupled to an input to a buffer 113. An output of the buffer 113 is coupled to pin 14. A Q output of the flip-flop 108 is coupled to an input to a buffer 114. An output of the buffer 114 is coupled to pin 16. A forth terminal of the oscillator 103 is coupled to receive a signal from a first terminal of a resonant threshold detector 115 to synchronize the oscillator 103. Pin 10 is coupled to deliver a zero voltage crossing signal to a second terminal of the resonant threshold detector 115 and to an inverting input to an amplifier 116. A non-inverting input to the amplifier 116 is coupled to a reference voltage level of 16 volts. An output of the amplifier 116 is coupled to a SET input to a flip-flop 117. A Q-not output of the flip-flop 117 is coupled to deliver a control signal to a first terminal of a master bias & uvlo 118 to shut down power to the fluorescent lamp if a voltage at pin 10 exceeds 16 volts. A second terminal of the master bias & uvlo 118 is coupled to a RESET input to the flip-flop 117 to restore power to the fluorescent lamp after a shut down by toggling the voltage at pin 15. A third terminal of the master bias & uvlo 118 is coupled to deliver a voltage reference level to pin 5. A forth terminal of the master bias & uvlo 118 is coupled to receive power from a first terminal of a linear regulator 119. A second terminal of the linear regulator 119 is coupled to receive power from pin 12. A third terminal of the linear regulator 119 is coupled to pin 2. Internal to the linear regulator 119, the third terminal of the linear regulator 119 is coupled to a cathode of a Zener diode DAZR (not shown). An anode of the Zener diode DAZR, is coupled to ground. A forth terminal of the linear regulator 119 is coupled to pin 13 and coupled to provide a supply voltage to the circuits within the dotted lines.

An invertor comprises T1, C6, LAMP, Q3, Q4 and R5. The inverter is known in the art as comprising a current fed Royer-type inverter. A resonant tank circuit comprises C6 and the primary winding of the transformer T1. Q3 and Q4 comprise a push-pull transistor pair. The controller 100 alternately turns Q3 and Q4 on. This draws current from the resonant tank circuit which in turn generates a voltage across the secondary winding of T1 to power the lamp. When a voltage at the center tap of the transformer reaches a zero voltage crossing, the controller turns on either Q3 or Q4 and turns off the other. Because the controller alternates only at zero crossings, the tank circuit is driven at its resonant frequency. An internal oscillator 103 provides the switching signals for start-up. The current drawn by Q3 and Q4 is substantially proportional to the current through the lamp. The current through the inverter generates a voltage at Pin 7 which is sensed and monitored by the controller so the lamp current can be monitored for controlling the lamp brightness. The voltage at the node that comprises the source of Q3, the source of Q4 and the first terminal of R5 is coupled to the inverting input of the amplifier 101 through R3. The output of the amplifier 101 is coupled to control the duty cycle of the buck regulator. The inverter does not regulate the lamp brightness by varying the switching frequency because the inverter drives the lamp at the resonant frequency of the tank circuit.

A buck regulator having a high side driver comprises T2, D1, U2-A, Q2 and L1. The buck regulator provides a square wave buck current signal to the inverter circuit though L1. The lamp brightness is regulated by a duty cycle of the buck signal and is controllable by the controller by switching U2-A and Q2. U2-A is the main power switch of the high side driver for driving the inductor L1 and the inverter circuit. U2-A has a high current capacity, and in the preferred embodiment, is a Dual 20 v, 0.10 Ohm, n-channel, MOSFET transistor manufactured by Motorola, under part number MMDF2N02. The controller drives the gate of U2-A through the miniature pulse transformer T2. T2 can be made with a ferrite bead with one turn on the primary winding and two turns on the secondary winding. Alternatively, T2 may be a low cost, surface mount transformer, such as part number CP-4LBM, which is available from Sumida, 637 East Golf Road, Suite 209, Arlington Heights, Ill., 60005.

When a controller output, a signal B-ON, is activated, the voltage generated at the secondary winding of T2 is greater than the voltage level of the signal B-ON because of the transformer. B-ON is a logic level voltage of approximately 5 volts. When the signal B-ON is activated, the diode D1 becomes forward biased so that the gate of U2-A becomes charged to a higher potential than B-ON (to approximately 10 volts). When B-ON is de-activated, the diode D1 then becomes reverse biased which captures the charge on the gate of U2-A because of the channel of the transistor Q2 so that there is no path for discharging this gate and thus keeps U2-A turned on. When the signal B-OFF is activated, the gate of Q2, a small signal device, is driven high by the controller. This turns Q2 on and causes the charge captured on the gate of U2-A to drain off to ground through Q2, turning U2-A off. By alternately activating B-ON and B-OFF, a current signal having a controllable duty cycle is generated.

Figure 2:
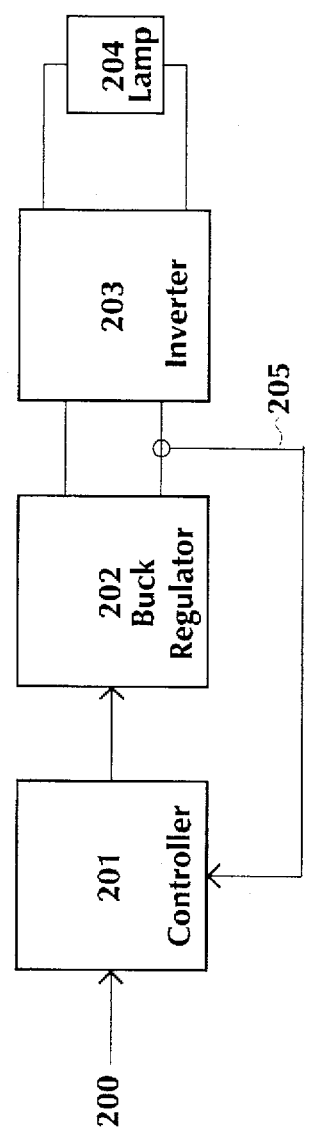
FIG. 2 shows a block diagram of a closed loop control system of the present invention.

Referring now to FIG. 2, a control loop of the present invention is shown. A reference signal 200 is supplied to a controller 201 to control a brightness level of the lamp 204. A feedback signal 205 is also supplied to the controller 201. The controller 201 controls a duty cycle of a buck regulator 202 based on the reference signal 200 and a feedback signal 205. The buck regulator 202 supplies current to an inverter 203 which powers the lamp 204. A current in the lamp is sensed and fed back to the controller 201 through the feedback signal 205 that is representative of the current in the lamp.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent that to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components, frequencies and voltage levels disclosed herein.

What is claimed is:

1. A circuit for supplying power to a fluorescent lamp comprising:
   a. a transformer having a primary winding and a secondary winding wherein the primary winding is coupled to receive a first current wherein a capacitor is coupled across the primary winding;
   b. a fluorescent lamp coupled to the secondary winding wherein a second current flows in the fluorescent lamp in response to the first current;
   c. a sensing circuit for sensing the first current coupled to receive the first current from the primary winding; and
   d. a controller coupled to the sensing circuit for controlling the first current in a feedback loop wherein the fluorescent lamp is electrically isolated from the controller by the transformer.

2. The circuit according to claim 1 wherein the first current is representative of the second current.

3. The circuit according to claim 1 further comprising a Royer-type inverter coupled to receive the first current from the primary winding and coupled to deliver the first current to the sensing circuit.

4. The circuit according to claim 1 further comprising a buck regulator coupled to provide the first current to the primary winding.

5. The circuit according to claim 3 wherein the sensing circuit comprises a resistor coupled to the Royer-type inverter for generating a sensing voltage that is proportional to the first current.

6. The circuit according to claim 5 wherein the sensing voltage is representative of the second current.

7. The circuit according to claim 6 wherein the controller controls a duty cycle of the buck regulator.

8. A circuit for supplying power to a fluorescent lamp comprising:
   a. a buck regulator for forming a buck signal;
   b. an inverter for forming a lamp signal coupled to receive the buck signal wherein the inverter comprises a resonant tank;
   c. a sensing circuit for forming a sensing signal that is representative of the lamp signal coupled to receive a current from the inverter; and
   d. a controller coupled to receive the sensing signal for controlling the first current in a feedback loop wherein the fluorescent lamp is electrically isolated from the controller.

9. The circuit according to claim 8 wherein the controller controls a duty cycle of the buck signal.

10. The circuit according to claim 8 wherein the sensing circuit comprises a resistor coupled to receive the current from the inverter.

11. The circuit according to claim 8 wherein the inverter comprises a transformer having a primary winding and a secondary winding wherein the primary winding is coupled to receive the buck signal and wherein the transformer electrically isolates the fluorescent lamp from the controller.

12. The circuit according to claim 11 wherein the lamp signal is applied to the fluorescent lamp in response to the buck signal.

13. A circuit for supplying power to a fluorescent lamp comprising:
   a. a buck regulator for forming a buck signal;
   b. a transformer having a primary winding, the primary winding having a center tap, a first primary terminal and a second primary terminal and the transformer having a secondary winding, the secondary winding having a first secondary terminal and a second secondary terminal wherein the center tip is coupled to receive the buck signal and wherein a capacitor is coupled between the first primary terminal and the second primary terminal thereby forming a resonant tank;
   c. a fluorescent lamp having a first lamp terminal and a second lamp terminal wherein the first lamp terminal is coupled to the first secondary terminal and the second lamp terminal is coupled to the second secondary terminal;
   d. a first transistor having a first drain, a first source and a first gate, wherein the first drain is coupled to the first primary terminal;
   e. a second transistor having a second drain, a second source and a second gate wherein the second drain is coupled to the second primary terminal;
   f. a controller for generating a first control signal and a second control signal wherein the first gate is coupled to receive the first control signal and the second gate is coupled to receive the second control signal; and
   g. a sensing circuit for generating a sensing signal coupled to the first source and to the second source and coupled to deliver the sensing signal to the controller for controlling the lamp brightness in a feedback loop wherein the fluorescent lamp is electrically isolated from the controller by the transformer.

14. The circuit according to claim 13 wherein the sensing circuit comprises a resistor having a terminal coupled to the first source and to the second source.

15. The circuit according to claim 13 wherein the controller controls a duty cycle of the buck regulator in response to the sensing signal.

16. A circuit for supplying power to a fluorescent lamp comprising:
   a. a transformer having a primary winding and a secondary winding wherein the primary winding is coupled to receive a first current and wherein a capacitor is coupled across the primary winding;
   b. a fluorescent lamp coupled to receive a second current from the secondary winding;
   c. a sensing circuit coupled to receive the entire first current; and
   d. a controller coupled to the sensing circuit for controlling the first current in a feedback loop wherein the fluorescent lamp is electrically isolated from the controller by the transformer.

17. The circuit according to claim 16 further comprising a buck regulator coupled to provide the first current to the primary winding.

18. The circuit according to claim 17 wherein the controller controls a duty cycle of the buck regulator.

19. The circuit according to claim 18 wherein the sensing circuit is coupled to provide a sensing signal representative of the second current to the controller.

20. The circuit according to claim 19 wherein the controller controls the duty cycle in response to the sensing signal.

21. A circuit for supplying power to a fluorescent lamp comprising:
   a. a buck regulator for forming a buck signal;
   b. an inverter for forming a lamp signal coupled to receive the buck signal wherein the inverter comprises a resonant tank having a resonant frequency;
   c. a sensing circuit for forming a sensing signal that is representative of the lamp signal coupled to receive a current from the inverter; and
   d. a controller coupled to receive the sensing signal for controlling a duty cycle of the buck signal in a feedback loop based upon the sensing signal wherein the controller drives the resonant tank at the resonant frequency and wherein the fluorescent lamp is electrically isolated from the sensing circuit by the transformer.

22. The circuit according to claim 21 wherein the sensing circuit comprises a resistor coupled to receive the current from the inverter.

23. The circuit according to claim 21 wherein the inverter further comprises a transformer having a primary winding and a secondary winding wherein the primary winding is coupled to receive the buck signal and the secondary winding is coupled to the fluorescent lamp.

24. The circuit according to claim 23 wherein the lamp signal is applied to the fluorescent lamp in response to the buck signal.

25. A circuit for supplying power to a fluorescent lamp comprising:
   a. a buck regulator for forming a buck signal;
   b. a transformer having a primary winding, the primary winding having a center tap, a first primary terminal and a second primary terminal and the transformer having a secondary winding, the secondary winding having a first secondary terminal and a second secondary terminal wherein the center lap is coupled to receive the buck signal and wherein a capacitor is coupled between the first primary terminal and the second primary terminal;
   c. a fluorescent lamp having a first lamp terminal and a second lamp terminal wherein the first lamp terminal is coupled to the first secondary terminal and the second lamp terminal is coupled to the second secondary terminal;
   d. a first transistor having a first drain, a first source and a first gate, wherein the first drain is coupled to the first primary terminal;
   e. a second transistor having a second drain, a second source and a second gate wherein the second drain is coupled to the second primary terminal;
   f. a controller for generating a first control signal and a second control signal wherein the first gate is coupled to receive the first control signal and the second gate is coupled to receive the second control signal; and
   g. a sensing circuit for generating a sensing signal coupled to the first source and to the second source and coupled to deliver the sensing signal to the controller for controlling a duty cycle of the buck signal in a feedback loop.

26. A circuit for supplying power to a fluorescent lamp comprising:
   a. transformer having a primary winding and a secondary winding wherein the primary winding is coupled to receive a first current and wherein a capacitor is coupled across the primary winding;
   b. a fluorescent lamp coupled to the secondary winding wherein a second current flows in the fluorescent lamp in response to the first current; and
   c. a sensing circuit for sensing the first current coupled to receive the first current from the primary winding for controlling a brightness level of the fluorescent lamp in a feedback loop wherein the fluorescent lamp is electrically isolated from the sensing circuit by the transformer.

27. The circuit according to claim 26 wherein the first current is representative of the second current.

28. The circuit according to claim 26 further comprising a Royer-type inverter coupled to receive the first current from the primary winding and coupled to deliver the first current to the sensing circuit.

29. The circuit according to claim 26 further comprising a buck regulator coupled to provide the first current to the primary winding.

30. The circuit according to claim 28 wherein the sensing circuit comprises a resistor coupled to the Royer-type inverter for generating a sensing voltage that is proportional to the first current.

31. The circuit according to claim 30 wherein the sensing voltage is representative of the second current.

32. The circuit according to claim 31 further comprising a controller coupled to receive the sensing voltage and coupled to control a duty cycle of the buck regulator.

33. A circuit for supplying power to a fluorescent lamp comprising:
   a. a buck regulator for forming a buck signal;
   b. a transformer having a primary winding, the primary winding having a center tap, a first primary terminal and a second primary terminal and the transformer having a secondary winding, the secondary winding having a first secondary terminal and a second secondary terminal wherein the center tap is coupled to receive the buck signal and wherein a capacitor is coupled between the first primary terminal and the second primary terminal;
   c. a fluorescent lamp having a first lamp terminal and a second lamp terminal wherein the first lamp terminal is coupled to the first secondary terminal and the second lamp terminal is coupled to the second secondary terminal;

d. a first transistor having a first drain, a first source and a first gate, where in the first drain is coupled to the first primary terminal;

e. a second transistor having a second drain, a second source and a second gate wherein the second drain is coupled to the second primary terminal;

f. a controller for generating a first control signal and a second control signal wherein the first gate is coupled to receive the first control signal and the second gate is coupled to receive the second control signal; and g. a sensing circuit for generating a sensing signal coupled to the first source and to the second source and coupled to deliver the sensing signal to the controller for controlling a brightness level of the fluorescent lamp in a feedback loop wherein the fluorescent lamp is electrically isolated from the sensing circuit by the transformer.

* * * * *

UNITED STATES PATENT AND TRADEMARK OFFICE
CERTIFICATE OF CORRECTION

PATENT NO. : 5,754,012

DATED : May 19, 1998

INVENTOR(S) : James LoCascio et al.

It is certified that error appears in the above-identified patent and that said Letters Patent is hereby correct as shown below:

Column 2, line 1, delete "A" before FIG. 2.

Column 2, line 52, delete "transformer Ti." and insert --transformer T1.--.

IN THE CLAIMS

Column 7, line 62, delete "the center lap" and insert --the center tap--.

Signed and Sealed this

Eighteenth Day of August, 1998

Attest:

BRUCE LEHMAN

*Attesting Officer*     *Commissioner of Patents and Trademarks*